March 22, 1966 G. H. FREIER 3,241,840

RECORD CENTERING MEANS FOR RECORD PLAYER TURNTABLE

Filed May 21, 1963

INVENTOR.
Gerald H. Freier
BY Brown, Jackson, Boettcher & Dienner
Attys.

United States Patent Office 3,241,840
Patented Mar. 22, 1966

3,241,840

RECORD CENTERING MEANS FOR RECORD PLAYER TURNTABLE

Gerald H. Freier, Benton Harbor, Mich., assignor to V-M Corporation, Benton Harbor, Mich., a corporation of Michigan Filed May 21, 1963, Ser. No. 281,924
7 Claims. (Cl. 274—39)

The present invention relates to a record centering member or adapter for use in conjunction with a record player turntable for centering a record which is positioned on the tuntable for playing.

More specifically, the invention relates to a record center hole adapter having an upper portion of a diameter corresponding approximately to the opening in small center hole records and a lower portion integral with said upper portion and of a diameter corresponding approximately to the opening in large center hole records, whereby upon vertical movement of the adapter a selected one of said upper or lower portions can be disposed in operative position for cooperation with a record supported in playing position on an associated record player turntable.

In the phonograph record industry it is common to provide records with either a small center hole approximately ¼ inch in diameter or with a large center hole approximately 1½ inches in diameter. The small center hole records are usually 33⅓ or 78 r.p.m. records having an outer diameter of 7, 10 or 12 inches, and the large center hole records are usually 45 r.p.m. records having an outer diameter of 7 inches. In order to accommodate records with either size of center hole, it is known in the art to provide a record player turntable having a small diameter center spindle for centering records having the small center hole, and to provide in conjunction therewith an adapter for centering the large center hole records. In the known devices referred to herein the adapter has an outer diameter corresponding to the large record center hole, and it is provided with a central aperture which permits it to be mounted over the standard small diameter spindle. In such devices, the adapter is commonly slidable vertically between an upper operative position wherein it projects into the plane of a record in playing position and a lower inoperative position wherein it is disposed below the plane of a record in playing position, and the adapter is normally guided during such vertical movement by projecting fingers or the like which engage in corresponding slots or openings formed in the associated turntable.

While the above-mentioned known record centering mechanisms provide the requisite upper small diameter spindle member and lower large diameter adapter member so that records with either large or small centerholes can be accommodated, and also permit the large diameter member to be retracted out of the way when not in use, yet such devices are subject to the disadvantage that the two centering members of different diameters are separate, and thus it is difficult to manufacture and assemble them so that they are concentric relative to one another. Another disadvantage of such devices is that in order to raise the adapter from its lower inoperative position to an upper position wherein it projects into the plane of a record on the turntable, it is necessary to grip the adapter at its large outer diameter and lift it, and since the vertical dimension of such adapters is usually quite small it can be rather difficult to manually grip them. In some known devices, rather complex linkage mechanism is provided to permit moving the adapter vertically without having to take hold of it.

It is an object of the present invention to provide a record centering member which is capable of accommodating records with either large or small centerholes and which overcomes the foregoing disadvantages of the devices heretofore known.

It is a further object of the invention to provide a unitary record centering member wherein both large and small diameter centering portions are formed on the same part so as to be integral with one another and thereby permit increased accuracy with respect to the concentricity of the two centering portions, and also to facilitate moving the adapter vertically by manually gripping the relatively long small diameter portion.

Still another object of the invention is to provide a record centering adapter which is associated with a flexible center portion of a turntable mat by means of a connecting cover strip or the like thus eliminating any gap between the adapter and the associated turntable mat and also permitting the flexible mat portion to be flexed upwardly and downwardly so as to follow the adapter when the latter is moved vertically between upper and lower positions.

Other advantages and uses of my invention will be apparent, or become so, as I describe my invention in greater detail in conjunction with the accompanying drawings in which:

FIGURE 1 is a fragmentary vertical section showing the record centering adapter member of the present invention slidably mounted on a center shaft of a record player and disposed in an upper position thereon wherein the large diameter portion of the adapter is disposed in operative position for centering a record of the type having a large center hole which record is shown in playing position on an associated turntable;

Figures 1, 2, 3, 4, 5:
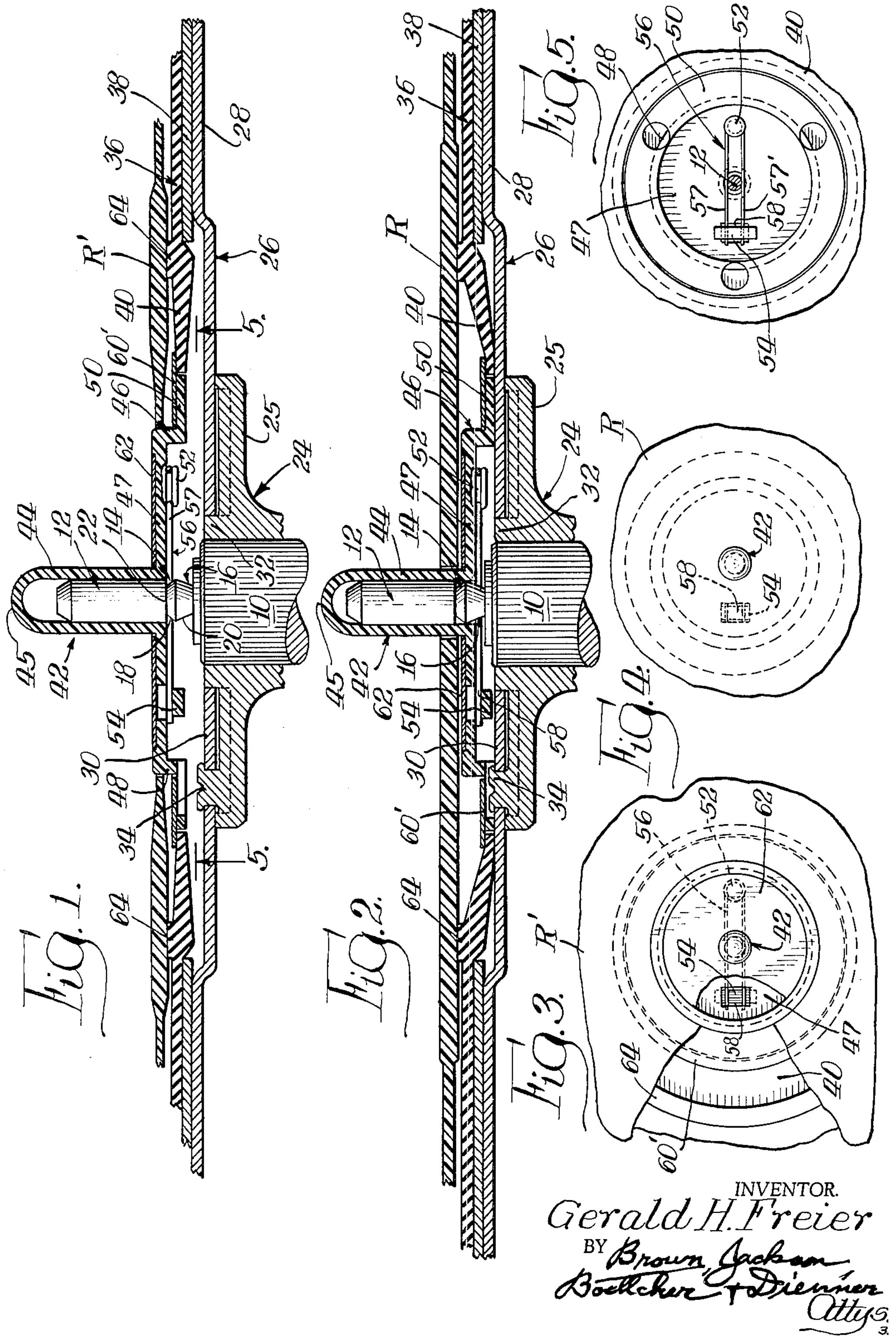
FIGURE 2 is a view similar to FIGURE 1 showing the record centering adapter member in its lower position wherein the small diameter portion is operatively disposed to center a record having a small center hole and wherein the large diameter portion is disposed in an inoperative position beneath the plane of the record on the turntable.
FIGURE 3 is a reduced fragmentary top plan view of the apparatus of FIGURE 1.
FIGURE 4 is a reduced fragmentary top plan view of the apparatus of FIGURE 2.
FIGURE 5 is a reduced fragmentary sectional view, taken substantially along the line 5—5 of FIGURE 1, illustrating a spring clip detent member for maintaining the adapter in either of its two vertical positions.

Referring now to the drawings, FIGURE 1 shows a rotatable record player spindle body 10 having a center shaft 12 which is integral with its upper end and extends upwardly therefrom. The center shaft 12 is provided at its lower end with a pair of vertically spaced detent grooves 14 and 16 formed by frusto-conical surfaces 18 and 20, and the shaft is further provided with a square shoulder 22 immediately above the upper detent groove 14.

A turntable hub 24 having a horizontal supporting flange 25 is fixedly mounted on the rotatable spindle body 10, and a turntable 26 is fixedly mounted on the supporting flange for rotation therewith. The turntable 26 comprises a circular plate member including a radially outer portion 28 and a recessed central portion 30. The recessed turntable portion 30 is provided with a central aperture to permit it to be mounted over a short upwardly extending sleeve 32 formed on the hub 24. The hub 24 is provided with a plurality of upwardly projecting stud fasteners such as shown at 34 which extend through corresponding apertures in the turntable 26 and are peened over the edges of the turntable to fixedly secure the latter to the hub member.

A turntable mat 36 is secured to the top surface of the turntable 26, and if desired a cardboard filler such as shown at 38 may be provided between the mat and the radially outer portion 28 of the turntable for the purpose of increasing the effective depth of the recessed center portion 30 of the turntable. It will be understood that the filler material 38 is fixedly secured to the top surface of the turntable by any suitable adhesive, and the mat 36 is also secured by means of an adhesive to the top of the filler material so as to be fixed relative to the turntable. However, the mat 36 has a radially inner portion 40 which extends radially inwardly beyond the inner edge of the filler material 38 so as to overlie the recessed turntable portion 30, and the mat is made of rubber or other suitable flexible material so that the central portion 40 thereof can flex upwardly and downwardly somewhat between the upper position shown in FIGURE 1 and the lower position shown in FIGURE 2 (as will be explained more fully hereinafter).

A record centering adapter is indicated generally at 42 and comprises an upper cylindrical portion 44 and a lower cylindrical portion 46 which is integral with the lower end of the upper portion. The upper centering portion 44 is generally tubular and has an inner diameter slightly larger than the diameter of the center shaft 12 so that it can be mounted over the shaft so as to slide vertically and rotate relative thereto, and it has an outer diameter corresponding to the opening in a record R of the type having a small center hole, so that such a record can be mounted over the upper adapter portion 44 and centered on the turntable 26 as shown in FIGURE 2. The outer diameter of the lower adapter portion 46 corresponds to the opening in a record R′ of the type having a large center hole so that such a record can be mounted over the lower adapter portion and centered on the turntable 26 in the manner shown in FIGURE 1.

It will be seen from the foregoing that the adapter 42 comprises an upper generally tubular member 44 of small diameter having a rounded nose portion 45 at its upper end, and at the lower end of the tubular portion a circular plate member 47 extends radially outwardly and is provided at its periphery with a downwardly depending annular flange 48 which comprises the lower large diameter adapter portion 46. At the lower end of the depending flange 48 an annular flange 50 extends radially outwardly for connection with the central portion of the turntable mat 36 as will be explained hereinafter. The adapter 42 comprises a unitary part which may for example be made of any suitable molded plastic material, and it will be understood that because the upper and lower centering portions 44 and 46 are integral with one another it is possible to provide greater accuracy with respect to their concentricity than has heretofore been possible.

The underside of the adapter plate portion 47 is provided with a downwardly projecting stud 52 at one side of the center shaft 12 and with a downwardly projecting rectangular boss 54 at the other side of the shaft, the boss 54 being generally U-shaped in elevation so as to provide a spring retainer slot 58. An elongated U-shaped spring detent clip 56 comprises a semi-circular end portion which is wrapped around the boss 52 and secured thereto, and a pair of leg portions 57 and 57′ the ends of which are seated in the slot 58 formed by the U-shaped boss 54. It will be seen that the spring legs 57 and 57′ straddle the portion of the center post 12 having the detent grooves 14 and 16 formed therein, and the spring clip 56 thereby cooperates with the grooved portion of the center shaft to yieldingly retain the adapter 42 either in its upper position as shown in FIGURE 1 or in its lower position as shown in FIGURE 2. When the adapter is lifted to its upper position, the spring legs 57 and 57′ snap into the detent groove 14, and when the adapter is urged downwardly, the leg members are first cammed outwardly and then snap into the lower detent groove 16. It will also be noted that when the adapter 42 is in its upper position the spring legs 57 and 57′ abut against the square shoulder 22 formed on the center shaft 12 so as to serve as a stop and thereby prevent further upward movement of the adapter.

An annular cover strip 60′, which may be made from a thin sheet of aluminum having an adhesive backing, is secured to the top surface of the radially outer adapter flange 50, and the cover strip is of a sufficient width so that it will overlie a part of the radially inner flexible mat portion 40 and thereby cover the gap between the adapter and the mat, as well as cover any molding holes in the adapter flange. The adhesive backing is disposed at the underside of the cover strip 60′, and if desired it can be secured to both the flange 50 and the mat portion 40 so as to also serve as a connection between such components. It will be understood from the foregoing that the flexible mat portion 40 is continuously connected with the adapter flange 50 and will flex vertically so as to follow the latter whether the adapter 42 is disposed in its upper position as shown in FIGURE 1 or in its lower position as shown in FIGURE 2. An adhesive back cover strip 62 is also applied to the top surface of the adapter plate portion 47 in order to cover any holes which are formed therein during the molding process.

The turntable mat 36 is provided on its top surface with an annular raised rib member 64 which comprises a supporting surface for a record which is positioned on the turntable 26. When a record R of the type having a small center hole is mounted on the turntable 26 so as to be supported on the rib 64, the adapter 42 is disposed in its lower position as shown in FIGURE 2, whereby the lower centering portion 46 will be in an inoperative position below the plane of the record, and the record will be centered on the turntable by the upper centering member 44. When a record R′ of the type having a large center hole is mounted on the turntable so as to be supported on the rib 64, the adapter 42 is first raised to its upper position as shown in FIGURE 1, whereby the lower centering portion 46 will project upwardly through the center hole of the record and thereby center the same. It will be understood that the relatively long small diameter centering portion 44 can readily be gripped for the purpose of manually raising or lowering the adapter 42 in accordance with the type of record desired to be played.

While I have illustrated my invention in a preferred form, I do not intend to be limited to that form, except insofar as the appended claims are so limited, since modifications coming within the scope of my invention will be readily suggested to others with my disclosure before them.

I claim:

1. In a record player, in combination, a turntable, a record centering adapter centrally located with respect to said turntable and vertically movable relative thereto, said adapter including an upper centering portion of a diameter corresponding approximately to the opening in a record of the type having a small center hole and a lower centering portion of a diameter corresponding approximately to the opening in a record of the type having a large center hole, said upper and lower centering portions being integral with one another and said adapter being movable vertically between an upper position wherein said lower centering portion is operatively disposed for cooperation with a record positioned on said turntable and a lower position wherein said lower centering portion is disposed in an inoperative position beneath the plane of a record positioned on said turntable and said upper centering portion is operatively disposed for cooperation with a record positioned on said turntable, and means for releasably retaining said adapter in whichever of said upper and lower positions it is moved to in accordance with the size of record to be played.

2. In a record player, in combination, a turntable, a record centering adapter centrally located with respect to said turntable and vertically movable relative thereto, said adapter including an upper centering portion of a diameter corresponding approximately to the opening in a record of the type having a small center hole and a lower centering portion of a diameter corresponding approximately to the opening in a record of the type having a large center hole, said upper and lower centering portions being integral with one another and said adapter being movable vertically between an upper position wherein said lower centering portion is operatively disposed for cooperation with a record positioned on said turntable and a lower position wherein said lower centering portion is disposed in an inoperative position beneath the plane of a record positioned on said turntable, and spring detent means associated with said adapter for yieldingly holding the same in a selected one of said upper and lower positions.

3. In a record player, in combination, a turntable, a vertical center post centrally disposed relative to said turntable, a record centering adapter centrally located with respect to said turntable and mounted on said center post for vertical sliding movement thereon, said adapter comprising an upper centering portion including a relatively long vertically disposed generally tubular member open at its lower end and slidably mounted over said center post, said tubular member having an outer diameter corresponding approximately to the opening in a record of the type having a small center hole, and a lower centering portion integral with the lower end of said tubular member and having an outer diameter corresponding approximately to the opening in a record of the type having a large center hole, said adapter being movable vertically on said center post between an upper position wherein said lower centering portion is operatively disposed for cooperation with a record positioned on said turntable and a lower position wherein said lower centering portion is disposed in an inoperative position beneath the plane of a record positioned on said turntable.

4. In a record player, in combination, a turntable, a vertical center post centrally disposed relative to said turntable, a record centering adapter centrally located with respect to said turntable and mounted on said center post for vertical sliding movement thereon, said adapter comprising an upper centering portion including a relatively long vertically disposed generally tubular member open at its lower end and slidably mounted over said center post, said tubular member having an outer diameter corresponding approximately to the opening in a record of the type having a small center hole, and a lower centering portion including a circular plate member integral with the lower end of said tubular member and extending radially outwardly therefrom, and a relatively short annular vertical flange formed at the periphery of said plate member, said flange being concentric relative to said tubular member and having an outer diameter corresponding approximately to the opening in a record of the type having a large center hole, and said adapter being movable vertically on said center post between an upper position wherein said lower centering portion is operatively disposed for cooperation with a record positioned on said turntable and a lower position wherein said lower centering portion is disposed in an inoperative position beneath the plane of a record positioned on said turntable.

5. In a record player, in combination, a turntable, a vertical center post centrally disposed relative to said turntable and having pair of vertically spaced grooves formed therein, a record centering adapter centrally located with respect to said turntable and mounted on said center post for vertical sliding movement thereon, said adapter comprising an upper centering portion including a relatively long vertically disposed generally tubular member open at its lower end and slidably mounted over said center post, said tubular member having an outer diameter corresponding approximately to the opening in a record of the type having a small center hole, and a lower centering portion including a circular plate member integral with the lower end of said tubular member and extending radially outwardly therefrom, a relatively short vertical flange formed at the periphery of said plate member, said flange being concentric relative to said tubular member and having an outer diameter corresponding approximately to the opening in a record of the type having a large center hole, said adapted being movable vertically on said center post between an upper position wherein said lower centering portion is operatively disposed for cooperation with a record positioned on said turntable and a lower position wherein said lower centering portion is disposed in an inoperative position beneath the plane of a record positioned on said turntable, and detent spring means carried by said adapter and positioned for engagement in a given one of said vertically spaced grooves in accordance with the vertical position of said adapter for yieldingly holding the same in a selected one of said upper and lower positions.

6. In a record player, in combination, a turntable, a mat fixed to the top surface of said turntable and having a radially inner flexible portion which is free to flex up and down relative to said turntable, a record centering adapter centrally located with respect to said turntable and vertically movable relative thereto, said adapter including an upper centering portion of a diameter corresponding approximately to the opening in a record of the type having a small center hole and a lower centering portion of a diameter corresponding approximately to the opening in a record of the type having a large center hole, said upper and lower centering portions being integral with one another and said adapter being movable vertically between an upper posoition wherein said lower centering portion is operatively disposed for cooperation with a record positioned on said turntable and a lower position wherein said lower centering portion is disposed in an inoperative position beneath the plane of a record positioned on said turntable, and a cover strip secured to said adapter adjacent the lower end of said lower centering portion and also secured to said flexible inner portion of said mat so as to cover any gap therebetween and also to thereby cause said flexible portion to flex upwardly and downwardly in accordance with vertical movement of said adapter.

7. In a record player, in combination, a turntable, a mat fixed to the top surface of said turntable and having a radially inner flexible portion which is free to flex up and down relative to said turntable, a vertical center post centrally disposed relative to said turntable, a record centering adapter centrally located with respect to said turntable and mounted on said center post for vertical sliding movement thereon, said adapter comprising an upper centering portion including a relatively long vertically disposed generally tubular member open at its lower end and slidably mounted over said center post, said tubular member having an outer diameter corresponding approximately to the opening in a record of the type having a small center hole, and a lower centering portion including a circular plate member integral with the lower end of said tubular member and extending radially outwardly therefrom, a relatively short downwardly depending flange formed at the periphery of said plate member, said flange being concentric relative to said tubular member and having an outer diameter corresponding approximately to the opening in a record of the type having a large center hole, said adapter being movable vertically on said center post between an upper position wherein said lower centering portion is operatively disposed for cooperation with a record positioned on said turntable and a lower position wherein said lower centering portion is disposed in an inoperative position beneath the plane of a record positioned on said turntable, an annular horizontal flange on said adapter integral with the lower end of said downwardly depending flange and extending radially outwardly therefrom so as to terminate proximate the radially inner edge of said flexible mat portion, and a cover strip secured to the upper surface of said horizontal flange and also secured to said flexible inner portion of said mat so as to cover any gap therebetween and also to thereby cause said flexible portion to flex upwardly and downwardly in accordance with vertical movement of said adapter.

References Cited by the Examiner

UNITED STATES PATENTS 2,762,627 9/1956 Johnson ............. 274—39

FOREIGN PATENTS 712,285 7/1954 Great Britain.
96,923 2/1961 Holland.

NORTON ANSHER, *Primary Examiner.*